United States Patent Office

3,795,595
Patented Mar. 5, 1974

3,795,595
ELECTROLYTIC PRODUCTION OF TIN AND LEAD SALTS USING ANION PERMSELECTIVE MEMBRANES
Harold P. Wilson, Sewickley, Pa., assignor to Vulcan Materials Company, Birmingham, Ala.
No Drawing. Filed July 29, 1971, Ser. No. 167,495
Int. Cl. C01b 9/08, 17/96, 35/00
U.S. Cl. 204—86                                     9 Claims

ABSTRACT OF THE DISCLOSURE

Tin and lead salts, e.g., stannous sulfate, are produced electrolytically by anodically dissolving tin or lead into an electrolyte in which the tin or lead salt is soluble while simultaneously substantially preventing migration of tin or lead cations from the anode to the cathode by maintaining an anion permselective barrier between the anode and the cathode, and then recovering the tin or lead salt from the electrolyte.

BACKGROUND OF THE INVENTION

Field of the invention

This invention relates to the electrolytic production of tin and lead salts using anion permselective membranes.

Summary of the prior art

Heretofore stannous sulfate has been produced by an involved process which includes producing an acid concentrated solution of stannous chloride from mossy tin, and reacting the acid solution with an alkaline solution to produce stannous oxide which is then washed and reacted with dilute sulfuric acid to produce a solution of stannous sulfate. Stannous sulfate is then crystallized out of the solution by the addition of concentrated sulfuric acid. Particular care must be taken, however, to prevent crystallization of undesired stannic sulfate. The presence of stannic tin in the stannous sulfate product is undesirable because, when the stannous sulfate product is used in electrolytic tin plating processes, electrochemical efficiency is reduced and precipitates tend to form which can affect the quality of the tin plate. Further, care must be taken to minimize chloride contamination of the stannous sulfate product. Yet another disadvantage of this process is that the ratio of sulfuric acid used to the product obtained is quite high and only a relatively small portion of the acid can be recycled.

The search has thus continued for more direct stannous sulfate processes which would reduce the number of major steps; which would eliminate the possibility of chloride contamination, and which would eliminate or substantially minimize the formation of stannic sulfate.

Tin sulfate may be produced non-electrolytically by the relatively simple reaction of tin metal in sulfuric acid solution, but this reaction is slow at room temperature even with vigorous agitation. When the temperature is raised to accelerate the reaction, the tin becomes coated with a black deposit which prevents further reaction. Sparging the solution with air as a catalyst in contact with the tin only increases the concentration of degradation products.

It is also known that copper sulfate may be produced by using a single or multiple compartment electrolytic cell wherein a porous diaphragm, e.g., an asbestos or cellulosic sheet, separates the anode and cathode compartments. It is also known that various metal salts may be produced electrolytically without using any membrane whatsoever. In this connection, see for example, U.S. Pats. 679,985, 736,924, 1,487,125 and 1,920,820.

In such cells, however, the fluid and ion permeable diaphragms permit the flow of electrolyte solution from one electrode compartment to another causing contamination, and such cells must also contend with plating of the metal on the cathode which is undesirable from the standpoint of process efficiency. And such cells are also characterized by high power consumption and high cell potential or voltage due to the corresponding high electrical resistance of these fluid permeable or semipermeable membranes.

In contrast to such known fluid permeable membranes, ion permselective membranes, also referred to as ion exchange membranes, have been found useful in a variety of fluid purification applications. One specific use is the demineralization of water. Other specific uses include the treatment of pickling liquors to produce sulfuric acid and electrolytic iron, the treatment of copper ore leaching solutions to produce hydrochloric acid and copper, and the purification of aluminum sulfate solutions by electrolytically depositing iron therefrom. In this connection, see Industrial and Engineering Chemistry, vol. 54, No. 6, page 29 (June 1962), and U.S. Pats. 3,537,961 and 3,347,761.

SUMMARY OF THE INVENTION

Accordingly, a primary object of the present invention is to provide for the electrolytic production of tin and lead salts using anion permselective membranes without incurring or substantially alleviating the problems heretofore associated with the production of such salts.

A more specific object of the present invention is to provide an electrolytic process for the production of stannous salts of sulfuric, hydrofluoric and fluoboric acids and plumbous salts of hydrofluoric and fluoboric acid using anion permselective membranes.

Yet another more specific object of the present invention is to provide an electrolytic process for the production of stannous sulfate using anion permselective membranes without significantly incurring tin plating of the cathode and contamination by stannic sulfate or tin chloride salts, and which process is also characterized by relatively low power requirements and the ability to recover and reuse electrolyte.

These and other objects will become apparent to one skilled in the art from the following:

In accordance with one aspect of the present invention, an electrolytic process for the production of tin and lead salts is provided by anodically dissolving tin or lead metal into the electrolyte and simultaneously substantially preventing migration of tin or lead cations from the anode to the cathode by maintaining an anion permselective barrier between the anode and cathode, and recovering the tin or lead salt from the electrolyte.

In another aspect of the present invention, an electrolytic process for the production of stannous sulfate is provided, wherein tin metal having a specific surface area of at least 0.1 cm.$^2$/gm. is placed in a pervious basket to act as the anode in an electrolytic cell, which also includes a cathode. An aqueous sulfuric acid electrolyte at a concentration of from 5 to 50, and preferably 10 to 20 percent, free sulfuric acid is placed in intimate contact with the cathode and with the tin metal in the basket. The electrolyte is maintained at a temperature of from 10° C. up to 40° C., and preferably at a temperature of from 20° C. to 30° C. Direct current at a current density of about 10 to 120, and preferably 10 to 100, amperes per square foot of anode area is applied to the anode and cathode to anodically dissolve tin from the basket into the electrolyte as stannous cations. Simultaneously, migration of stannous cations from the anode to the cathode is substantially prevented by maintaining an electrolyte fluid-impermeable anion exchange resin membrane as an anion permselective barrier between the anode and the cathode, which results in the formation of a stannous sulfate product solution substantially free of stannic cations and chloride anions in the anode compartment of the electrolytic cell with substantially no plating of metal on the cathode. The stannous sulfate product solution is removed or circulated out of the electrolytic cell and solid stannous sulfate is recovered therefrom, forming a sulfuric acid electrolyte depleted of stannous sulfate. This depleted sulfuric acid electrolyte is recycled or circulated back into the anode compartment of the electrolytic cell for reuse.

Other aspects and advantages of the present invention will become apparent to one skilled in the art from the following description of the preferred embodiments.

DESCRIPTION OF THE PREFERRED EMBODIMENTS

The electrolytic cell used in accordance wtih the present invention to produce the tin and lead salts typically includes at least one anode and at least one cathode immersed in a liquid electrolyte and separated by an anion permselective membrane. The anodes and cathodes are connected to a suitable power source at their terminals; whenever potential is applied at the terminals, tin or lead cations are anodically produced in the anode compartment. The anode compartment may also be provided with an agitator or stirrer while heating or cooling means may be provided to maintain the electrolyte at the desired operating temperature.

The electrolytic cell may be operated at anode current densities of about 5 to 200, and more desirably 10 to 100, amperes per square foot of anode area, and at cell voltages ranging from about 1 to 10 volts. The temperature of the electrolyte may be from about 10 up to about 100° C. but more typically is about 10 to 40°, and preferably is from about 20 to 30° C.

The term anode area as used herein is defined as the cross-sectional area of the immersed frontal area of the anode or anode basket, facing the cathode.

Of course, one may also employ a multiple cell operation, i.e., anode baskets interposed between multiple cathodes. For example, the electrolytic cell may comprise two stainless steel cathodes with a single interposed pervious anode basket holding mossy tin. The tin or lead metal which comprises the anode is preferably in a comminuted form which will allow its surface area to come into intimate contact with the liquid electrolyte. Preferably, the lead or tin is in mossy form and has a specific surface area of at least 0.1 cm.$^2$/g., and preferably at least about 0.5 cm.$^2$/g. If the tin or lead metal is in a non-supporting form such as in mossy form or as machine turnings, filings, rod borings, or the like, a pervious or electrolyte permeable anode basket is used to hold the tin or lead metal. If the tin or lead metal is in a self supporting form such as a sheet, coiled wire, or a cast ingot, an anode basket is not necessary. In general, the less the tin or lead metal is compressed or compacted, the more access the electrolyte will have to surface area of the metal and electrochemical process efficiency will be improved.

If an anode basket is used, the basket may be fabricated or made from any conductive or non-conductive material which is substantially inert under process conditions. Preferably, the anode basket or container is non-conductive and fabricated from a synthetic resin or plastic, e.g., polypropylene or poly(methyl methacrylate) sheet. However, the basket could also be made of conductive material such as metal wire mesh. The anode basket or container may be of any convenient shape and the overall size of the anode basket may be varied according to the particular scale of operation. Generally, as for the degree of perviousness or free area of the anode basket, as much free area as possible is desired, for if the free area of the basket is relatively low, i.e., below about 10 percent of the total side and bottom area of the basket, electro- chemical efficiencies will be depressed. Preferably, the free area of the anode basket is at least about 30 percent.

Any type of cathode material that has low reactivity in the electrolyte solution, i.e., is substantially inert to the electrolyte, may be used. For example, sheets or panels of iron or steel may be used. Stainless steel has been found to be particularly suitable.

The electrolyte may be any aqueous electrolytic solution which will anodically dissolve tin or lead. Typically, the aqueous electrolytic solution is an aqueous solution of a strong inorganic or organic acid which is highly ionized in solution or has high complexing action. Typically, the concentration of the acid solution ranges from about 5 to 50 percent free acid. As indicated above, aqueous sulfuric acid solutions in concentrations of about 5 to 50 percent, and preferably 10 to 20 percent, are used for the production of stannous sulfate.

Other suitable electrolytes include aqueous solutions of hydrofluoric acid and hydrofluroboric acid. Aqueous solutions of phosphoric and citric acids may also be used.

In general, any type of anion permselective membrane may be used which will substantially exclude or prevent the tin or lead cations from passing from the anode compartment to the cathode compartment of the electrolytic cell.

Typically, the anion permselective membrane is an anion exchange membrane or sheet which is substantially impermeable to the aqueous electrolyte. These anion exchange membranes are well known per se and include both membranes where ion exchange groups or material are impregnated in or distributed throughout a polymeric matrix or binder, as well as those where such groups are associated only with the outer surface of a membrane backing or reinforcing fabric. Continuous ion exchange membranes, in which the entire membrane structure has ion-exchange characteristics and which may be formed by molding or casting a partially polymerized ion exchange resin into sheet form, may also be used.

For example, the ion exchange material may include material to which basic groups such as ordinary ammonium radicals are added to a polystyrene resin by conventional procedures. In the alternative, the groups may be added by contacting the surface to be coated with a reactant, the molecular structure of which leaves exposed on the surface thereof ion exchange groups of the same type as those found upon the surfaces of anion exchange membranes, e.g., ordinary ammonium radicals.

Widely known anion exchange membranes may be prepared by copolymerizing a mixture of ingredients, one of which contains a substituent or group which is basic in nature and which may comprise amine groups, ordinary ammonium groups, the guanidine group, the dicyandiamine group and other nitrogen-containing basic groups. Thus, this ionizable group may be attached to a polymeric compond such as phenolformaldehyde resin, a styrene-divinyl benzene copolymer, a urea-formaldehyde resin, a melamine-formaldehyde resin, a polyalkylene-polyamine-formaldehyde resin or the like.

The preparation of these anion exchange membranes are well known in the art and for sake of brevity are not further described herein; for more detailed information, reference may be made to U.S. Pats. 2,636,851, 2,681,319, 2,681,320, 2,723,229, 2,730,768, 3,356,607 and 3,480,495.

In addition to these organic anion exchange membranes, inorganic ion exchange membranes may also be used. Such inorganic anion exchange membranes include thorium oxide anion exchange membranes, as well as those comprising the metals of Group IV$b$ of the Periodic Table and those of the Actinide series in the form of insoluble metal chelate compounds. Further description of these inorganic ion exchange membranes may be found in U.S. Pats. 3,479,267 and 3,463,713.

Typically, these ion exchange membranes are reinforced, i.e., have a backing consisting of a sheet of a relatively inert material, as for example, glass having a woven or mesh structure. Other known backings include woven and non-woven fabrics of materials such as asbestos, polyesters, polyamides, acrylics, modacrylics, ceramic or glass fibers, vinylidene chloride, rayons, polypropylene, polytetrafluoroethylene and the like. Fabrics or backings made of mixtures of two or more of these materials may also be used in the present invention.

The thickness of the anion permselective membrane is not particularly critical, but will of course depend on the particular operating conditions. In general, suitable membranes may be as thin as 20,000th of an inch to as much as ½ inch thick. The minimum thickness of a membrane will also depend on the total thickness of the supporting structure. Although the thicker membranes have a longer useful life, their electrical resistances increase proportionally to their thickness, so that if the membrane is made increasingly thicker, a value will be obtained for which the resistance is too great for practical use.

Typical commercially available anion exchange membranes include those available from Ionics Incorporated, Watertown, Mass.; from Ionac Chemical Company, Birmingham, N.J., under the trade name "Ionac," and from AMF Incorporated of New York, N.Y., under the trade name "AMFion."

The tin or lead salt may be recovered from the anode electrolyte solution by any of the conventional techniques well known to those skilled in the art. For example, the tin or lead salts may be recovered by fractional crystallization of the salt from the electrolyte solution by addition of a more concentrated solution of acid or by vacuum evaporation to crystallize the salt out of the electrolyte solution. For a more detailed description of crystallizing evaporators and the like, see Chemical Engineers Handbook, John H. Perry, 4th ed., 1963 (McGraw-Hill, New York). See also U.S. Pat. 1,920,820.

The present invention may be conducted on a batch, semi-continuous, or continuous basis and at atmospheric, superatmospheric or subatmospheric pressures, typically at atmospheric pressure.

The present invention is further illustrated by the following examples: all parts, percentages and ratios in the examples, as well as in other parts of the specification and claims, are by weight unless otherwise specified.

EXAMPLE I

This example illustrates the production of stannous sulfate using an anion permselective membrane in accordance with the present invention. Five runs were made using an electrolytic cell rectangular in cross section and whose walls and base were fabricated from 1.75 cm. thick Plexiglas poly(methyl methacrylate) acrylic sheet. Dividing this cell into anode and cathode compartments was a fabric-backed anion exchange membrane composed of an aminated copolymer of styrene and divinyl benzene, number MA-3475 from the Ionac Chemical Company, of Birmingham, N.J. This anion exchange membrane was strongly anionized and anion permselective, having a 99% anion permselectivity measured in a 0.5 N NaCl/1.0 N NaCl cell. This membrane was also substantially impermeable to electrolyte flow, as it passed less than 7 ml. $H_2O$/hr./ft.$^2$ at 30 p.s.i. and less than 3 ml. $H_2O$/hr./ft.$^2$ at 10 p.s.i. This membrane was approximately 14 to 15 mils thick, had an approximate density of 360 g./m.$^2$, with a Mullen burst strength of 200 p.s.i. This membrane also had an electrical resistance of 10.5 ohm-cm.$^2$, A.C. measurement in 0.1 N NaCl, and 5.2 ohm-cm.$^2$, A.C. measurement in 1.0 N NaCl.

The total volumetric capacity (working solution capacity) of the electrolytic cell was 2.5 liters approximately evenly divided by the membrane between the anode and cathode compartments. The width of the cell at the membrane was 12.8 cm. An anode basket was constructed from .32 cm. thick Plexiglas acrylic sheet with outside dimensions of 10 cm. height, 10 cm. length, and 3.8 cm. width. The sides of the basket were perforated up to a basket height of about 7.2 cm. with circular holes of .96 cm. diameter on 1.27 cm. centers. This basket was suspended in the electrolytic cell and the cell was filled with sulfuric acid electrolyte so that about 7 cm. of the height of the basket was submerged. The anode compartment of the electrolytic cell was also supplied with a motor driven glass propeller for agitation. The anode basket was filled with 459 g. of fine size mossy tin having a specific surface area of about 0.5 cm.$^2$/g. The mossy tin was connected to a source of direct current through a pure tin wire inserted into the mossy tin. The cathode consisted of an electro-tin plated iron sheet having about the same submerged area as the immersed frontal area of the anode basket. The first four runs conducted, 1–1 to 1–4, were batch operations, while run 1–5 was a semi-continuous operation wherein electrolyte was pumped out of the anode compartment and passed through a heat exchanger to a reservoir flask to simulate recovery of stannous sulfate from the electrolyte solution, and the electrolyte solution was then recycled back to the anode compartment of the cell.

Data and results for the five runs are shown in Table I.

TABLE I.—PRODUCTION OF STANNOUS SULFATE

| Run number | Electrochemical values | | | | |
| --- | --- | --- | --- | --- | --- |
| | 1-1 | 1-2 | 1-3 | 1-4 | 1-5 |
| Total electrolysis time, min. | 505 | 318 | 221 | 121 | [1] 2,407 |
| Average temperature of the anode solution, °C. | 20.7 | 27.5 | 30.8 | 33.1 | 23.0 |
| Current consumption, amp.-hr. | 35.32 | 35.96 | 34.63 | 28.63 | 107.45 |
| Average current, amperes | 4.196 | 6.780 | 9.402 | 14.197 | 2.68 |
| Average anode current density, amp./ft.$^2$ frontal area | 63.80 | 92.76 | 128.64 | 194.25 | 35.29 |
| Average membrane current density, amp./ft.$^2$ | 37.43 | 59.04 | 81.88 | 123.64 | 30.16 |
| Average cell potential, volts | 2.71 | 2.76 | 3.29 | 4.29 | 1.71 |
| Average anode current efficiency, percent | 115.5 | 99.3 | 101.60 | 101.8 | 109.19 |
| Power consumption, kwh./lb. $SnSO_4$ | 0.271 | 0.322 | 0.377 | 0.485 | 0.184 |
| Production rate, lb. $SnSO_4$/hr.-ft.$^2$ | 0.637 | 0.796 | 1.124 | 1.719 | 0.327 |
| Total tin electrolyzed, g. | | | | | |
| Percent electrolyzed tin plated on cathode | | | | | |

[1] Circulating.

COMPOSITIONS OF ANODE AND CATHODE SOLUTIONS

Run number 1-1

| | Initial | | | |
| --- | --- | --- | --- | --- |
| Solution | Anode | Cathode | Final anode | Final cathode |
| Solution volume, ml. | 1,200 | 1,200 | 1,200 | 1,200 |

| | G.p.l. | Percent | G.p.l. | Percent | G.p.l. | Percent |
| --- | --- | --- | --- | --- | --- | --- |
| Element or compound: | | | | | | |
| Total: | | | | | | |
| Sn | | | 74.16 | | 0.31 | |
| Sn$^{+2}$ | | | 73.36 | | 0.31 | |
| Sn$^{+4}$ | | | 0.80 | | | |
| $SnSO_4$ | | | 132.74 | 11.31 | 0.56 | 0.05 |
| $Sn(SO_4)_2$ | | | 2.09 | 0.18 | | |
| Free: | | | | | | |
| $H_2SO_4$ | 157.91 | 14.59 | 108.84 | 9.27 | 146.98 | 13.62 |
| $H_2O$ | | | | 79.24 | | 86.33 |
| Density, g./ml. (at about 25°C.) | 1.082 | | 1.174 | | 1.079 | |

Run number 1-2

| | Initial | | | |
| --- | --- | --- | --- | --- |
| Solution | Anode | Cathode | Final anode | Final cathode |
| Solution volume, ml. | 1,200 | 1,200 | 1,150 | 1,200 |

| | G.p.l. | Percent | G.p.l. | Percent | G.p.l. | Percent |
| --- | --- | --- | --- | --- | --- | --- |
| Element or compound: | | | | | | |
| Total: | | | | | | |
| Sn | | | 67.68 | | | |
| Sn$^{+2}$ | | | 66.91 | | 0.31 | |
| Sn$^{+4}$ | | | 0.77 | | | |
| $SnSO_4$ | | | 121.07 | 10.09 | 0.56 | 0.05 |
| $Sn(SO_4)_2$ | | | 2.02 | 0.17 | | |
| Free: | | | | | | |
| $H_2SO_4$ | 220.68 | 19.69 | 178.10 | 14.84 | 210.29 | 18.79 |
| $H_2O$ | | | | 74.90 | | |
| Density, g./ml. (at about 25°C.) | 1.121 | | 1.200 | | | |

Run number 1-3

| | Initial | | | |
|---|---|---|---|---|
| Solution | Anode | Cathode | Final anode | Final cathode |
| Solution volume, ml | 1,200 | 1,200 | 1,200 | 1,200 |
| Element or compound: | G.p.l. | Percent | G.p.l. Percent | G.p.l. Percent |
| Total: | | | | |
| Sn | | 63.75 | | |
| $Sn^{+2}$ | | 62.88 | 0.31 | |
| $Sn^{+4}$ | | 0.87 | | |
| $SnSO_4$ | | 113.78 | 9.56 0.56 | 0.05 |
| $Sn(SO_4)_2$ | | 2.28 | 0.19 | |
| Free: | | | | |
| $H_2SO_4$ | 220.80 | 19.63 | 175.13 14.72 | 208.04 18.71 |
| $H_2O$ | | | 75.33 | |
| Density, g./ml. (at about 25° C.) | 1.125 | | 1.190 | 1.112 |

Run number 1-4

| | Initial | | | |
|---|---|---|---|---|
| Solution | Anode | Cathode | Final anode | Final cathode |
| Solution volume, ml | 1,200 | 1,200 | 1,180 | 1,200 |
| Element or compound: | G.p.l. | Percent | G.p.l. Percent | G.p.l. Percent |
| Total: | | | | |
| Sn | | 54.15 | | |
| $Sn^{+2}$ | | 53.71 | 0.12 | |
| $Sn^{+4}$ | | 0.44 | | |
| $SnSO_4$ | | 97.18 | 8.12 0.22 | 0.02 |
| $Sn(SO_4)_2$ | | 1.15 | 0.10 | |
| Free: | | | | |
| $H_2SO_4$ | 218.35 | 19.44 | 185.38 15.66 | 211.14 18.85 |
| $H_2O$ | | | 76.03 | |
| Density, g./ml. (at about 25° C.) | 1.123 | | 1.184 | 1.120 |

Run number 1-5

| | Initial | | | |
|---|---|---|---|---|
| Solution | Anode | Cathode | Final anode | Final cathode |
| Solution volume, ml | ¹ 1,200 | ² 3,878 | 1,200 | |
| Element or compound: | G.p.l. | Percent | G.p.l. Percent | G.p.l. Percent |
| Total: | | | | |
| Sn | | 66.84 | | |
| $Sn^{+2}$ | | 65.91 | 0.62 | |
| $Sn^{+4}$ | | 0.93 | | |
| $SnSO_4$ | | 119.26 | 9.94 1.12 | 0.10 |
| $Sn(SO_4)_2$ | | 2.44 | 0.20 | |
| Free: | | | | |
| $H_2SO_4$ | 224.48 | 19.90 | 174.86 14.57 | 194.42 17.50 |
| $H_2O$ | | | 75.29 | 82.40 |
| Density, g./ml. (at about 25° C.) | 1.128 | | 1.200 | 1.111 |

¹ In each compartment.
² Total anode working solution.

As may be seen from Table I, in all of the runs the average anode current efficiency was close to or better than 100%, the latter case indicating that the mossy tin underwent some spontaneous reaction in addition to the electrolytic dissolution. Very little tin was plated out on the cathode and the concentration of soluble tin in the cathode solution was relatively low.

EXAMPLE II

The runs of this example illustrate the advantages of using an anion permselective membrane to produce stannous sulfate as opposed to using a conventional cellulosic semi-permeable membrane (cardboard or other stiff paperboard). The runs were made using the electrolytic cell described in Example I except in runs 2-C1 and 2-C2 the membrane was composed of three layers of thin cardboard sandwiched by thin layers of Lab-Por porous polyethylene and in all of the runs the pure tin wire anode contact rod was replaced with a type 316 stainless steel contact rod. In addition, the cathode was a thin type 316 stainless steel plate instead of the electro-tin plated iron plate. Further, the electrolyte solution was circulated out of and back into the anode compartment at a rate of about 325 mls. per minute by a conventional metering pump which returned the solution to the midpoint of the mossy tin in the anode basket so that the solution circulated thoroughly the mossy tin to minimize any formation of stannic tin. As in Example I, the electrolyte circulation system also included a water-cooled heat exchanger which maintained the temperature of the anode solution near room temperature.

Data and results are given in Table II.

TABLE II.—PRODUCTION OF STANNOUS SULFATE
[Comparative electrochemical process values]

| Electroysis run number | 2-1 | 2-2 | 2-C1 | 2-C2 |
|---|---|---|---|---|
| | Ionac MA-3475 anion exchange membrane | Ionac MA-3475 anion exchange membrane | Cardboard-porous polyethylene membrane | Cardboard-porous polyethylene membrane |
| Total electroysis time, min | 1,645 | 1,575 | 1,445 | 1,445 |
| Average temperature of the anode solution, °C | 23.2 | 22.4 | 24.9 | 23.6 |
| Current consumption, amp.-hr | 110.56 | 116.63 | 102.40 | 115.60 |
| Average current, amperes | 4.03 | 4.44 | 4.25 | 4.8 |
| Average anode current density amp./ft.² frontal area | 52.16 | 60.75 | 58.15 | 62.13 |
| Average membrane current density, amp./ft.² | 36.85 | 40.10 | 37.46 | 42.30 |
| Average cell potential, volts | 2.08 | 2.26 | 5.38 | 4.8 |
| Average anode current efficiency, percent | 102.21 | 104.11 | 110.43 | 94.04 |
| Power consumption, kwh./lb. $SnSO_4$ | 0.243 | 0.247 | 0.575 | 0.474 |
| Production rate, lb. $SnSO_4$/hr.-ft.² | 0.448 | 0.556 | 0.544 | 0.503 |
| Total tin electrolyzed, g | 244.72 | 268.8 | 246.83 | 239.1 |
| Percent electrolyzed tin plated on cathode | 0.057 | 0.056 | 0.125 | 0.117 |
| Rate of tin transport, g./amp.-hr.-ft.² membrane | 0.1546 | 0.1633 | 0.3384 | 0.3278 |

COMPOSITIONS OF ANODE AND CATHODE SOLUTIONS

Run number 2-1

| | Initial | | | |
|---|---|---|---|---|
| Solution | Anode | Cathode | Final anode | Final cathode |
| Solution volume, ml | 1,200 | 1,200 | 1,200 | 1,200 |
| | G.p.l. | Percent | G.p.l. Percent | G.p.l. Percent |
| Element or compound: | | | | |
| Total: | | | | |
| Sn | | 64.51 | 0.37 | |
| $Sn^{+2}$ | | 63.06 | | |
| $Sn^{+4}$ | | 1.45 | | |
| $SnSO_4$ | | 114.10 | 9.49 0.67 | 0.06 |
| $Sn(SO_4)_2$ | | 3.80 | 0.32 | |
| Free: | | | | |
| $H_2SO_4$ | 237 | 20.7 | 183.49 15.27 | 203.69 18.32 |
| $H_2O$ | | | 74.92 | 81.62 |
| Density, g./ml. (at about 25° C.) | 1.1436 | | 1.202 | 1.112 |

Run number 2-2

| | Initial | | | |
|---|---|---|---|---|
| Solution | Anode | Cathode | Final anode | Final cathode |
| Solution volume, ml | 1,200 | 1,200 | 1,200 | 1,200 |
| | G.p.l. | Percent | G.p.l. Percent | G.p.l. Percent |
| Element or compound: | | | | |
| Total: | | | | |
| Sn | | 69.75 | 0.46 | |
| $Sn^{+2}$ | | 69.75 | | |
| $Sn^{+4}$ | | 0.00 | | |
| $SnSO_4$ | | 126.21 | 10.46 0.83 | 0.07 |
| $Sn(SO_4)_2$ | | 0.00 | 0.00 | |
| Free: | | | | |
| $H_2SO_4$ | 231 | 203 | 172.37 14.28 | 193.62 17.32 |
| $H_2O$ | | 79.7 | 75.26 | 82.61 |
| Density, g./ml. (at about 25° C.) | 1.135 | | 1.207 | 1.118 |

Run number 2-C1

| Solution | Initial Anode | Initial Cathode | Final anode | Final cathode |
|---|---|---|---|---|
| Solution volume, ml | ¹ 1,200 | ² 2,600 | | 1,200 |

| Element or compound | G.p.l. | Percent | G.p.l. | Percent | G.p.l. | Percent |
|---|---|---|---|---|---|---|
| Total: | | | | | | |
| Sn | | | 64.44 | | 0.66 | |
| Sn⁺² | | | 63.50 | | | |
| Sn⁺⁴ | | | 0.94 | | | |
| SnSO₄ | | | 114.90 | 9.89 | 1.19 | 0.11 |
| Sn(SO₄)₂ | | | 2.46 | 0.21 | | |
| Free: | | | | | | |
| H₂SO₄ | 169.5 | 15.5 | 101.97 | 8.78 | 146.45 | 13.54 |
| H₂O | | | | | | 86.35 |
| Density, g./ml. (at about 25° C.) | | | 1.1612 | | 1.0819 | |

Run number 2-C2

| Solution | Initial Anode | Initial Cathode | Final anode | Final cathode |
|---|---|---|---|---|
| Solution volume, ml | ¹ 1,200 | ² 2,600 | | 1,200 |

| Element or compound | G.p.l. | Percent | G.p.l. | Percent | G.p.l. | Percent |
|---|---|---|---|---|---|---|
| Total: | | | | | | |
| Sn | | | 61.89 | | 1.25 | |
| Sn⁺² | | | 61.46 | | | |
| Sn⁺⁴ | | | 0.43 | | | |
| SnSO₄ | | | 111.21 | 9.26 | 2.26 | 0.20 |
| Sn(SO₄)₂ | | | 1.13 | 0.09 | | |
| Free: | | | | | | |
| H₂SO₄ | 24.05 | 21.14 | 191.63 | 15.95 | 215.35 | 19.16 |
| H₂O | | | | | | 80.64 |
| Density, g./ml. (at about 25° C.) | 1.1377 | | 1.2014 | | 1.1241 | |

¹ In each compartment.
² Total anode working solution.

As may be seen from Table II, the rate of tin cation transport through the cellulosic semi-permeable membrane through the anode solution to the cathode solution is about double the rate allowed by the anion exchange membrane. Further, power consumption is nearly twice as high and cell potential is at least double with the conventional cellulosic semi-permeable membrane as compared to the anion exchange membrane. Further, it may also be seen that the conventional cellulosic semi-permeable membrane did not to any extent repel tin cations to limit cation transport to a minimum while the anion exchange membrane had at least a 90% selectivity to anion and repelled cations. Moreover, as may also be seen from Table II, over twice as much tin plated on the stainless steel cathode when the conventional cellulosic semi-permeable membrane was used as compared to the amount of tin plated on the cathode when the anion exchange membrane was used.

EXAMPLE III

This example illustrates the electrolytic production of stannous sulfate in accordance with that aspect of the present invention which utilizes a solid self-supporting anode instead of a mossy tin supported in an anode basket. Runs 3-1 and 3-2 of this example were conducted in accordance with Example I except that an electrolytic cell having a total volumetric capacity of 300 mls. was used, and the anode consisted of coiled tin wire instead of mossy tin in the anode basket, and the cathode was a thin panel of type 316 stainless steel. Further, the anode solution was stirred with a magnetic stirrer instead of the glass agitator. Further, instead of the Ionac MA-3475 membrane, an Ionac MA-3236 membrane was used. This membrane also consisted of fabric impregnated with an aminated copolymer of styrene and divinyl benzene, but had a membrane thickness of 12 mils, a Mullen burst strength of 165 p.s.i., a water permeability of 0.8 mls./hr.-ft.² at 10 p.s.i., and an anion permselectivity of 93.3% in 0.5 N NaCl. Further, electrical resistance was 35 ohm cms. in 0.1 N NaCl, and 20 ohm cms. in 1.0 N NaCl.

Runs were conducted on a batch basis, and data and results are given in Table III.

TABLE III.—PRODUCTION OF STANNOUS SULFATE

| | Electrochemical values | |
|---|---|---|
| Run number | 3-1 | 3-2 |
| Total electrolysis time, min | 204 | 292 |
| Average temperature of the anode solution, °C | 23.6 | 20.4 |
| Current consumption, amp.-hr | 3.4 | 4.867 |
| Average anode area, ft.² | 0.0131 | |
| Average anode current density amp./ft.² frontal area | 76.3 | 32.74 |
| Average membrane current density, amp./ft.² | | |
| Average cell potential, volts | 1.50 | 1.41 |
| Average anode current efficiency, percent | 94.6 | 99.28 |
| Power consumption, kwh./lb. SnSO₄ | 0.180 | 0.161 |
| Production rate, lb. SnSO₄/hr.-ft.² anode area | 0.479 | 0.288 |
| Total tin electrolyzed, g | | |
| Percent electrolyzed tin plated on cathode | | |

COMPOSITIONS OF ANODE AND CATHODE SOLUTIONS

Run number 3-1

| Solution | Initial Anode | Initial Cathode | Final anode | Final cathode |
|---|---|---|---|---|
| Solution volume, ml | 124 | 100 | | |

| Element or compound | G.p.l. | Percent | G.p.l. | Percent | G.p.l. | Percent |
|---|---|---|---|---|---|---|
| Total: | | | | | | |
| Sn | | | 57.92 | | 0.72 | |
| Sn⁺² | | | 57.41 | | 0.72 | |
| Sn⁺⁴ | | | 0.51 | | | |
| SnSO₄ | | | 103.88 | | | |
| Sn(SO₄)₂ | | | | | | |
| Free: | | | | | | |
| H₂SO₄ | 150.0 | | | | | |
| H₂O | | | | | | |
| Density, g./ml. (at about 25° C.) | 1.143 | | | | | |

Run number 3-2

| Solution | Initial Anode | Initial Cathode | Final anode | Final cathode |
|---|---|---|---|---|
| Solution volume, ml | 128 | 100 | | |

| Element or compound | G.p.l. | Percent | G.p.l. | Percent | G.p.l. | Percent |
|---|---|---|---|---|---|---|
| Total: | | | | | | |
| Sn | | | 83.86 | | | |
| Sn⁺² | | | 83.58 | | | |
| Sn⁺⁴ | | | 0.28 | | | |
| SnSO₄ | | | 151.23 | 12.90 | | |
| Sn(SO₄)₂ | | | 0.73 | 0.06 | | |
| Free: | | | | | | |
| H₂SO₄ | 156.9 | | 93.66 | 7.99 | | |
| H₂O | | | | | | |
| Density, g./ml. (at about 25° C.) | 1.102 | | 1.172 | | | |

EXAMPLE IV

This example illustrates the production of stannous fluoride by direct electrolysis of mossy tin in dilute hydrobuoric acid solution using the same general procedure and electrolytic cell described in Example I, except that the anion exchange membrane used was an AMFion A-60 anion exchange membrane, which is an anion permselective membrane having a polyethylene backbone containing polyelectrolytes of quaternized ammonium, making these membranes permeable to anion groups. The A-60 membrane has a thickness of 12 mils, a Mullen burst strength of 45 p.s.i., an electrical resistance of 6 ohm cm.² and an 80% anion permselectivity measured in a 0.5 N KCl./1.0 N KCl solution.

A volume of 1300 mls of 14.84% hydrofluoric acid solution was circulated through the mossy tin in the anode compartment as in Example III at a rate of approximately 325 mls. per minute.

Data and results are shown in Table IV.

TABLE IV.—PRODUCTION OF STANNOUS FLUORIDE

Electrochemical Values

| | |
|---|---:|
| Total electrolysis time, min. | 1680 |
| Average temperature of the anode solution, °C. | 29.2 |
| Current consumption, amp.-hr. | 148.504 |
| Average current, amperes | 5.304 |
| Average anode current density, amp./ft.$^2$ frontal area | 61.95 |
| Average membrane current density, amp./ft.$^2$ | 42.64 |
| Average cell potential, volts | 4.75 |
| Average anode current efficiency, percent | 99.51 |
| Power consumption, kwh./lb. SnF$_2$ | 0.766 |
| Production rate, lb. SnF$_2$/hr.-ft.$^2$ | 0.384 |
| Total tin electrolyzed, g. | 325.0 |
| Percent electrolyzed tin plated on cathode | 0.43 |

COMPOSITION OF ANODE AND CATHODE SOLUTIONS

| Solution | Initial Anode | Initial Cathode | Final anode | | Final cathode | |
|---|---|---|---|---|---|---|
| Solution volume, ml. | 1,300 | 1,200 | 1,611 | | | |
| Element or compound: | G.p.l. | Percent | G.p.l. | Percent | G.p.l. | Percent |
| Total: | | | | | | |
| Sn | | | 200.86 | | 0.25 | |
| Sn$^{+2}$ | | | 196.35 | | 0.07 | |
| Sn$^{+4}$ | | | 4.51 | | 0.18 | |
| SnF$_2$ | | | 259.20 | 20.69 | 0.09 | 0.01 |
| SnF$_4$ | | | 7.40 | 0.59 | 0.30 | 0.03 |
| Free: | | | | | | |
| HF | 152.58 | 14.84 | 80.32 | 6.41 | 32.88 | 3.33 |
| H$_2$O | | | | 72.31 | | 96.63 |
| Density, g./ml. (at about 25° C.) | 1.028 | | 1.253 | | 0.988 | |

Vacuum evaporation of the product anode solution containing 20.69% SnF$_2$, 0.59% SnF$_4$, and 6.41% free HF at vacuum and low temperature would yield about 85% of the SnF$_2$ in pure white crystals containing 100% SnF$_2$ with no stannic tin following filtration, washing, and high vacuum drying at about 70° C. The filtrate containing 17.62% SnF$_2$, 5.94% SnF$_4$, and 25.10% free HF would be recycled to the electrolytic cell, resulting in savings and cost of materials. Stannic tin, as in the production of stannous sulfate, would be reduced by the mossy tin anode to maintain a low equilibrium concentration.

EXAMPLE V

This example illustrates the production of stannous fluoborate. In this example, the general procedure and apparatus of Example IV are utilized except that the electrolyte is hydrofluoric acid.

Data and results are shown in Table V.

TABLE V.—PRODUCTION OF STANNOUS FLUOBORATE

Electrochemical Values

| | |
|---|---:|
| Total electrolysis time, min. | 2964 |
| Average temperature of the anode solution, 0 C. | 19.3 |
| Current consumption, amp.-hr. | 210.57 |
| Average current, amperes | 4.262 |
| Average anode current density, amp./ft.$^2$ frontal area | 56.69 |
| Average membrane current density, amp./ft.$^2$ | 38.97 |
| Average cell potential, volts | 3.28 |
| Average anode current efficiency, percent | 97.56 |
| Power consumption, kwh./lb. Sn(BF$_4$)$_2$ | 0.292 |
| Production rate, lb. Sn(BF$_4$)$_2$/hr.-ft.$^2$ | 0.637 |
| Total tin electrolyzed, g. | 444.97 |
| Percent electrolyzed tin plated on cathode | 3.87 |

COMPOSITIONS OF ANODE AND CATHODE SOLUTIONS

| Solution | Initial Anode | Initial Cathode | Final anode | | Final cathode | |
|---|---|---|---|---|---|---|
| Solution volume, ml. | 1,300 | 1,200 | 1,350 | | 1,600 | |
| Element or compound: | G.p.l. | Percent | G.p.l. | Percent | G.p.l. | Percent |
| Total: | | | | | | |
| Sn | | | 313.08 | 20.53 | 3.20 | 0.21 |
| Sn$^{+2}$ | | | 306.07 | 20.70 | | |
| Sn$^{+4}$ | | | 7.01 | 0.46 | | |
| Sn(BF$_4$)$_2$ | | | 753.81 | 49.43 | 5.69 | 0.52 |
| Sn(BF$_4$)$_4$ | | | 27.60 | 1.81 | | |
| Free: | | | | | | |
| HBF$_4$ | 381.10 | 32.74 | 243.69 | 15.98 | 250.76 | 22.90 |
| H$_2$O | | | | 32.78 | | 76.58 |
| Density, g./ml. (at about 25° C.) | 1.164 | | 1.525 | | 1.095 | |

EXAMPLE VI

This example illustrates the production of lead (plumbous) fluoroborate utilizing the general procedure and apparatus of Example V, except that Ionac MA-3236 ion exchange membrane was used, as in Example III.

Data and results are summarized in Table VI.

TABLE VI.—PRODUCTION OF LEAD (PLUMBOUS) FLUOBORATE

Electrochemical Values

| | |
|---|---:|
| Total electrolysis time, min. | 2964 |
| Average temperature of the anode solution, °C. | 18 |
| Current consumption, amp.-hr. | 171,842 |
| Average current, amperes | 3.48 |
| Average anode current density, amp./ft.$^2$ frontal area | 43.29 |
| Average membrane current density, amp./ft.$^2$ | 29.95 |
| Average cell potential, volts | 4.90 |
| Average anode current efficiency, percent | 86.90 |
| Power consumption, kwh./lb. Pb(BF$_4$)$_2$ | 0.360 |
| Production rate, lb. Pb(BF$_4$)$_2$ ft.$^2$ | 0.588 |
| Total lead electrolyzed, g. | 1059.84 |
| Percent electrolyzed lead plated on cathode | 3.73 |

COMPOSITIONS OF ANODE AND CATHODE SOLUTIONS

| Solution | Initial Anode | Initial Cathode | Final anode | | Final cathode | |
|---|---|---|---|---|---|---|
| Solution volume, ml. | 1,300 | 1,200 | 1,200 | | 1,200 | |
| Element or compound: | G.p.l. | Percent | G.p.l. | Percent | G.p.l. | Percent |
| Lead | | | 418.20 | 25.33 | 0.70 | 0.60 |
| Pb(BF$_4$)$_2$ | | | 767.88 | 46.51 | 1.29 | 0.12 |
| Free: | | | | | | |
| HBF$_4$ | 404.92 | 34.52 | 194.82 | 11.80 | 340.55 | 30.85 |
| H$_2$O | | | | 41.69 | | 69.03 |
| Density, g./ml. (at about 25° C.) | 1.173 | | 1.651 | | 1.104 | |

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. An electrolytic process for the production of lead or tin salts utilizing an electrolytic cell comprising a cathode and an anode comprising the metal to be dissolved and an ion permselective barrier dividing the electrolytic cell into anode and cathode compartments, which process comprises anodically dissolving either lead metal into an electrolyte selected from the group consisting of hydrofluoric acid and fluoboric acid or tin metal into an electrolyte selected from the group consisting of hydrofluoric acid, fluoboric acid, and sulfuric acid to form lead or tin cations therein and simultaneously substantially preventing migration of the lead or tin cations from the anode to the cathode by maintaining the ion permselective barrier between the anode and the cathode, and recovering the lead or tin salt from the electrolyte.

2. An electrolytic process for the production of stannous sulfate, which process comprises:
   placing tin metal in a pervious basket to act as the anode in an electrolytic cell which further comprises a cathode;
   providing an aqueous electrolyte of sulfuric acid in intimate contact with the cathode and in immediate contact with the metal in the basket;
   applying direct current to the anode and cathode to anodically dissolve the tin metal from the basket into the electrolyte as stannous cations and simultaneously substantially preventing migration of stannous cations between the anode and the cathode by maintaining an electrolyte fluid impermeable anion exchange membrane as an anion permselective barrier between the anode and the cathode to form stannous sulfate in the electrolyte; and
   recovering the stannous sulfate from the electrolyte.

3. An electrolytic process for the production of tin salts utilizing an electrolytic cell comprising an anode and a cathode and an anion permselective barrier dividing the electrolytic cell into anode and cathode compartments, which process comprises anodically dissolving tin metal into an electrolyte to form tin cations therein and simultaneously substantially preventing migration of the tin cations from the anode to the cathode by maintaining the anion permselective barrier between the anode and the cathode, and recovering the tin salt from the electrolyte.

4. The process of claim 3 wherein the electrolyte is selected from the group consisting of sulfuric acid, hydrofluoric acid, and hydrofluorboric acid.

5. The process of claim 3 which further comprises, while anodically dissolving the tin metal into the electrolyte, continuously passing electrolyte into and out of the anode compartment; and wherein the tin salt is recovered from the electrolyte passed out of the anode compartment.

6. An electrolytic process for the production of a metallic salt consisting of a stannous or plumbous cation and an anion selected from the group consisting of fluoride and fluoborate, which process comprises:
   placing tin or lead metal in a pervious basket to act as the anode in an electrolytic cell which further comprises a cathode;
   providing an aqueous electrolyte selected from the group consisting of hydrofluoric acid and hydrofluoboric acid in intimate contact with the cathode and in intimate contact with the metal in the basket;
   applying direct current to the anode and cathode to anodically dissolve tin or lead metal from the basket into the electrolyte as stannous or plumbous cations, and simultaneously substantially preventing migration of stannous or plumbous cations between the anode and the cathode by maintaining an electrolyte fluid-impermeable anion exchange membrane as an anion permselective barrier between the anode and the cathode to form a stannous or plumbous salt in the electrolyte; and
   recovering the stannous or plumbous salt from the electrolyte.

7. The electrolytic process of claim 1 for the production of lead salts utilizing an electrolytic cell comprising an anode and a cathode and an anion permselective barrier dividing the electrolytic cell into anode and cathode compartments, which process comprises anodically dissolving lead metal into an electrolyte selected from the group consisting of hydrofluoric acid and hydrofluoboric acid to form lead cations therein and simultaneously substantially preventing migration of the lead cations from the anode to the cathode by maintaining the anion permselective barrier between the anode and the cathode, and recovering the lead salt from the electrolyte.

8. An electrolytic process for the production of stannous sulfate; which process comprises:
   providing an electrolytic cell comprising an anode compartment and a cathode compartment;
   placing tin metal in a pervious basket in the anode compartment to act as the anode in the electrolytic cell which further comprises a cathode, the tin metal in a form having a specific surface area of at least about 0.1 cm.$^2$/gm.;
   providing an aqueous sulfuric acid electrolyte at a concentration of from 5 to 50 percent in intimate contact with the tin metal in the basket;
   maintaining the sulfuric acid electrolyte at a temperature of from 10° C. up to 40° C.;
   applying direct current at a current density of about 10 to 120 amperes per square foot of anode area to the anode and cathode to anodically dissolve tin metal from the basket to the electrolyte as stannous cations, and simultaneously substantially preventing migration of the stannous cations from the anode to the cathode by maintaining an electrolyte fluid-impermeable anion exchange resin membrane as an anion permselective barrier between the anode and the cathode to form a stannous sulfate product solution substantially free of stannic cations and chloride anions in the anode compartment of the electrolytic cell with substantially no plating of metal on the cathode;
   removing the stannous sulfate product solution from the electrolytic cell;
   recovering stannous sulfate from the product solution removed from the electrolyte cell, forming a sulfuric acid solution depleted of stannous sulfate; and thereafter,
   recycling the depleted sulfuric acid solution to the anode compartment of the electrolytic cell.

9. The process of claim 8 wherein the electrolyte is maintained at a temperature of about 20° C. to 30° C. and at a sulfuric acid concentration of from 10 to 20 percent; and which process further comprises maintaining a current density of about 10 to 100 amperes per square foot of anode area.

References Cited

UNITED STATES PATENTS

| | | | |
|---|---|---|---|
| 1,947,006 | 2/1934 | Heineken et al. | 204—93 X |
| 2,014,148 | 9/1935 | Sievert | 204—86 |
| 2,104,549 | 1/1938 | Stockdale et al. | 204—86 |
| 3,198,720 | 8/1965 | Knippers et al. | 204—121 |
| 2,673,837 | 3/1954 | Lowe et al. | 204—94 |
| 3,300,397 | 1/1967 | Baltakmens et al. | 204—94 |

FOREIGN PATENTS

| | | | |
|---|---|---|---|
| 1,902,723 | 11/1969 | Germany | 204—86 |

FREDERICK C. EDMUNDSON, Primary Examiner

U.S. Cl. X.R.

204—93, 94

UNITED STATES PATENT OFFICE
CERTIFICATE OF CORRECTION

Patent No. 3,795,595      Dated March 5, 1974

Inventor(s) Harold P. Wilson

It is certified that error appears in the above-identified patent and that said Letters Patent are hereby corrected as shown below:

Col. 6, line 57, delete "Free:"
      line 58, before "$H_2SO_4$" insert -- Free --.

Col. 6, line 73, delete "Free:"
      line 74, before "$H_2SO_4$" insert -- Free --.

Col. 7, line 14, delete "Free:"
      line 15, before "$H_2SO_4$" insert -- Free --.

Col. 7, line 29, delete "Free:"
      line 30, before "$H_2SO_4$" insert -- Free --.

Col. 7, line 46, delete "Free:"
      line 47, before "$H_2SO_4$" insert -- Free --.

Col. 8, line 57, delete "Free:"
      line 58, before "$H_2SO_4$" insert -- Free --.

Col. 8, line 73, delete "Free:"
      line 74, before "$H_2SO_4$" insert -- Free --.

Col. 9, line 14, delete "Free:"
      line 15, before "$H_2SO_4$" insert -- Free --.

Col. 9, line 29, delete "Free:"
      line 30, before "$H_2SO_4$" insert -- Free --.

UNITED STATES PATENT OFFICE
CERTIFICATE OF CORRECTION

Patent No. 3,795,595      Dated March 5, 1974

Inventor(s) Harold P. Wilson

It is certified that error appears in the above-identified patent and that said Letters Patent are hereby corrected as shown below:

Col. 10, line 35, delete "Free:"
line 36, before "$H_2SO_4$" insert -- Free --.

Col. 11, line 33, delete "Free:"
line 34, before "HF" insert -- Free --.

Col. 11, line 54, delete "hydrofluoric acid" and insert therefor -- hydrofluoboric acid --.

Col. 12, line 13, delete "Free:"
line 14, before "$HBF_4$" insert -- Free --.

Col. 12, line 53, delete "Free:"
line 54, before "$HBF_4$" insert -- Free --.

Signed and sealed this 1st day of October 1974.

(SEAL)
Attest:

McCOY M. GIBSON JR.
Attesting Officer

C. MARSHALL DANN
Commissioner of Patents